United States Patent [19]

Garois

[11] Patent Number: 6,028,142

[45] Date of Patent: Feb. 22, 2000

[54] CROSS-LINKED ELASTOMER CAPABLE OF THERMOPLASTIC TRANSFORMATION, METHOD OF MANUFACTURE AND USES THEREOF

[75] Inventor: Nicolas Garois, Amilly, France

[73] Assignee: Hutchinson, Paris, France

[21] Appl. No.: 08/983,530

[22] PCT Filed: May 20, 1997

[86] PCT No.: PCT/FR97/00881

§ 371 Date: Jan. 20, 1998

§ 102(e) Date: Jan. 20, 1998

[87] PCT Pub. No.: WO97/44390

PCT Pub. Date: Nov. 27, 1997

[30] Foreign Application Priority Data

May 21, 1996 [FR] France ................................ 96 06262

[51] Int. Cl.[7] .............................. C08G 63/48; C08F 8/30; C08L 8/00; C08L 35/00
[52] U.S. Cl. ............................ 525/183; 525/74; 525/197; 525/207
[58] Field of Search ..................... 525/207, 197, 525/74, 183; 524/525

[56] References Cited

U.S. PATENT DOCUMENTS

| | | |
|---|---|---|
| 4,130,535 | 12/1978 | Coran et al. . |
| 5,086,121 | 2/1992 | Hazelton et al. ........................ 525/197 |
| 5,281,670 | 1/1994 | Lee et al. . |
| 5,597,866 | 6/1995 | White et al. ............................... 525/74 |
| 5,807,639 | 1/1996 | Frappier et al. ...................... 428/475.5 |
| 5,869,563 | 6/1996 | Kawasaki et al. ....................... 524/525 |

FOREIGN PATENT DOCUMENTS

| | | |
|---|---|---|
| 643078 | 3/1995 | European Pat. Off. . |
| 0751182 | 1/1997 | European Pat. Off. . |

*Primary Examiner*—Bernard Lipman
*Assistant Examiner*—Tanya Zalukaeva
*Attorney, Agent, or Firm*—Alston & Bird LLP

[57] ABSTRACT

The present invention relates to a crosslinked elastomer with thermoplastic conversion and to a process for its manufacture. The elastomer with thermoplastic conversion is characterized in that it includes at least one polyoctene and a grafted polyolefin. The invention has numerous industrial applications, especially in the manufacture of insulating and/or leakproofing gaskets and packings as employed for thermal and sound insulation and/or leakproofing against water and moisture, as well as of conduits, tubes, pipes, tubings, couplings and the like for the transfer of fluids.

15 Claims, No Drawings

CROSS-LINKED ELASTOMER CAPABLE OF THERMOPLASTIC TRANSFORMATION, METHOD OF MANUFACTURE AND USES THEREOF

The present invention relates to a crosslinked elastomer with thermoplastic conversion and to a process for its manufacture and to its uses.

For the manufacture of some articles such as insulating and/or leakproofing gaskets and packings and conduits, pipes, tubes or the like for the transfer of fluids like those employed, for example, by the automobile industry (in braking, cooling, power steering or air conditioning circuits, and the like), it is desirable to have available materials which, while exhibiting properties that are similar to those of elastomers and especially an ability to withstand large deformations without breaking and an ability to recover their initial geometry after stresses of the elongation or compression type, even when repeated, as well as a good behaviour towards heat, chemical agents and inclement weather, can be processed by the techniques and the equipment which are employed by the converters of thermoplastic materials, this being chiefly to permit the recycling of these articles as well as that of the waste produced in the course of their manufacture, recycling which the use of elastomers does not permit.

Accordingly, in U.S. Pat. No. 4,130,535 polyolefin-based "thermoplastic elastomers" have been proposed, which exhibit a structure consisting of an uncrosslinked polypropylene matrix and crosslinked nodules of ethylene/propylene/diene (EPDM) terpolymer, so as to exhibit at the temperature of use—which is lower than the melting temperature of polypropylene—a behaviour similar to that of elastomers after vulcanization, while heating them above this melting temperature allows them to be processed like thermoplastics.

Although these materials actually exhibit a certain number of properties which are equivalent to those of elastomers, they nevertheless show a high residual elongation set (higher than 50%) at temperatures above 100° C., and this makes their use not very appropriate to the manufacture of articles intended to be employed in regions where temperatures of more than 100° C. prevail, such as possibly insulating and/or leakproofing gaskets and packings or else conduits, pipes, tubes and the like, intended to ensure the transfer of fluids in the engine compartment of a motor vehicle.

It is consequently an objective of the invention to provide a material which, while being capable of being processed and converted like a thermoplastic, exhibits a mechanical behaviour similar to that of elastomers with, in particular, a low residual deformation by stresses, even when the latter are applied at very high temperatures, as well as good resistance to heat, to inclement weather and to chemical agents, so as to be able advantageously to replace these elastomers, and especially rubber, in the industrial manufactured products in which they are traditionally employed.

It is also an objective of the invention to provide such a material, the manufacture of which is simple and the cost of production of which is economically advantageous.

These objectives are attained according to the present invention by a crosslinked elastomer with thermoplastic conversion, characterized in that it includes at least one elastomer with polymerization using a metallocene catalyst and a grafted polyolefin.

Within the meaning of the present invention an elastomer with polymerization using a metallocene catalyst is intended to mean any elastomer consisting of a homopolymer, a copolymer or a terpolymer, the polymerization of which has been carried out by means of a metallocene catalyst.

According to a preferred embodiment of the invention, the elastomer with polymerization using a metallocene catalyst is chosen from octene/ethylene polymers. These copolymers, which are also called polyoctenes, are available from Du Pont Dow under the trade name Engage and exist in various grades which differ especially in their density, their viscosity and their hardness, and all of which are capable of being employed for the production of an elastomer in accordance with the invention.

According to an advantageous provision of the invention, the grafted polyolefin is chosen from the group which includes polyethylenes, polypropylenes and ethylene/propylene polymers grafted with acrylic acid, maleic anhydride or glycidyl methacrylate.

A polypropylene grafted with maleic anhydride is preferably employed, in which the richness in carboxyl functional groups permits additional bonds to be created between the said polypropylene and the elastomeric matrix formed by the elastomer with polymerization using a metallocene catalyst. In addition, the Applicant Company has found that the use of a propylene/maleic anhydride polymer with a high content of maleic anhydride allows the elastomer in accordance with the invention to be given particularly satisfactory compression set properties. Within the meaning of the present invention a "high content of maleic anhydride", is intended to mean a maleic anhydride content which is higher than or equal to 1 mass % of the total mass of the propylene/maleic anhydride polymer.

According to another advantageous provision of the invention, the crosslinked elastomer with thermoplastic conversion additionally includes an ethylene/propylene (EPM) polymer or an ethylene/propylene/diene (EPDM) polymer, the presence of which enables it to be given a pliancy and a more elastic character.

Any copolymer of ethylene and of propylene with or without termonomer (diene) can be employed for producing an elastomer in accordance with the invention. However, the Applicant Company has found that the terpolymers of ethylene, propylene and ethylidenenorbornene, and especially those which have a high molecular mass (reflected in a high viscosity, that is to say higher than or equal to 50 Mooney points), a low ethylene content (between 50 and 70 and, preferably, lower than 60, mass % of the total mass of the terpolymers) and a high ethylidenenorbornene content (higher than or equal to 8 mass % of the total mass of the terpolymers), are particularly suitable for the production of an elastomer in accordance with the invention, the reason being that these terpolymers have a high reactivity, high vulcanization kinetics, a high bridging density and a low residual compression set. Such ethylene, propylene and ethylidenenorbornene terpolymers are, for example, available from Exxon under the trade name Vistalon.

In addition, the use of an oil-extended terpolymer of ethylene, propylene and ethylidenenorbornene has been found to be particularly advantageous because it is reflected in greater ease of performing the mixing of the various constituents which are needed for the production of the elastomer in accordance with the invention.

In accordance with the invention the crosslinked elastomer with thermoplastic conversion includes, in parts on a mass basis:

20 to 100 parts of elastomer with polymerization using a metallocene catalyst, 5 to 50 parts of grafted polyolefin, and 0 to 75 parts of EPM or of EPDM.

According to a particularly preferred embodiment of the crosslinked elastomer with thermoplastic conversion, this elastomer exhibits the following qualitative and quantitative formulation, expressed in parts on a mass basis:

30 to 85 parts of polyoctene, 10 to 30 parts of propylene/maleic anhydride polymer, and 10 to 50 parts of EPDM.

Advantageously, the crosslinked elastomer with thermoplastic conversion in accordance with the invention may also contain a polyacrylic elastomer such as a terpolymer of ethylene, of acrylate and of acrylic acid or a terpolymer of styrene, of acrylonitrile and of acrylate, which acts as an antiultraviolet agent and film-forming agent and which allows the surface appearance of the elastomer to be improved when the latter is processed by extrusion. When such a polyacrylic elastomer is employed, it is preferably in a proportion of 2 to 20 parts on a mass basis per 100 parts on a mass basis of the mixture of elastomer with polymerization using metallocene catalyst/grafted polyolefin/EPM or EPDM.

Also advantageously the crosslinked elastomer with thermoplastic conversion may additionally contain a plasticizer whose presence makes it possible to increase its fluidity and, consequently, to facilitate its processing and to adjust the hardness of the products resulting from this processing as a function of a hardness value which is sought after. This plasticizer is preferably a paraffinic plasticizer of the type of those marketed by Total under the trade name Plaxene, or by Exxon under the trade name Flexon, and is employed in a proportion of 5 to 120 parts on a mass basis per 100 parts on a mass basis of the mixture of elastomer with polymerization using metallocene catalyst/grafted polyolefin/EPM or EPDM. However, other plasticizers, such as a polyalkylbenzene, may also be suitable.

The crosslinked elastomer with thermoplastic conversion may also contain fillers of the light filler type: silicas, carbonates, clays, chalk, kaolin, etc, or carbon blacks. The use of the latter has been found to be particularly advantageous because they make it possible not only to modulate some mechanical properties of the elastomer in accordance with the invention, such as the tensile strength or the tensile moduli, but also to give it an excellent resistance to the action of the ultraviolet. When such fillers are present in the elastomer, they are advantageously present at a level of 5 to 100 parts on a mass basis per 100 parts on a mass basis of the mixture of elastomer with polymerization using metallocene catalyst/grafted polyolefin/EPM or EPDM.

The crosslinked elastomer with thermoplastic conversion may additionally contain other adjuvants traditionally employed in the polymer industry like, for example, antistatics, lubricants, antioxidants, coupling agents, colourants, processing aids or else adhesiveness promoters, according to the properties which it is intended to be given, provided, of course, that these adjuvants are mutually compatible.

The elastomer in accordance with the invention is said to be "crosslinked", the reason being that its preparation involves a crosslinking of the elastomeric matrix of which it consists, that is to say of the elastomer with polymerization using a metallocene catalyst and, where appropriate, other elastomers which it includes (EPM or EPDM, polyacrylic elastomer, etc).

As a result, the elastomer in accordance with the invention contains, before crosslinking, at least one crosslinking system including one or more crosslinking agents which are suitably chosen according to the nature of the polymers forming part of its composition, and one or more crosslinking promoters, the function of which is to activate the kinetics of the reaction and to increase the density of crosslinking.

According to a preferred provision of the invention this crosslinking system includes, as crosslinking agent(s), one or more organic peroxides chosen from the group including dicumyl peroxide, 1,3-bis(t-butylisopropyl)benzene peroxide, 2,5-dimethyl-2,5-bis-t-butylhexane peroxide and 1,1-bis(t-butyl)-3,3,5-trimethylcyclohexane, and, as crosslinking promoter(s), one or more compounds chosen from the group including zinc oxide, stearic acid, N,N-m-phenylenedimaleimide, triallyl or triisoallyl cyanurates, methacrylates (like tetrahydrofurfuryl or 2-phenoxyethyl methacrylates), dimethacrylates (like ethylene glycol, tetraethylene glycol, 1,4-butanediol or zinc dimethacrylates), trimethacrylates (like trimethylolpropane trimethacrylate) and diacrylates (like zinc diacrylate).

According to another preferred provision of the invention, the crosslinking system is a sulphur-based system which includes, besides zinc oxide and/or stearic acid as crosslinking promoter(s), one or more sulphur-donor accelerators such as 4,4-dithiomorpholine, tetramethylthiuram disulphide, dipentamethylenethiuram tetrasulphide or zinc dibutyldithiocarbamate and, optionally, an antireversion agent such as 1,3-bis(cis-traconimidomethyl)benzene.

According to a particularly preferred provision of the invention the crosslinking system includes, as crosslinking agent, a phenolic resin chosen from reactive alkylated methylphenol-formaldehyde and bromomethyl-phenol-formaldehyde resins and, as crosslinking promoter, a chlorine-containing polymer such as a chlorinated or chlorosulphonated polyethylene or a polychloroprene, optionally used in combination with zinc oxide and/or stearic acid. In fact, this latter crosslinking system makes it possible to obtain elastomers which, besides exhibiting extremely satisfactory mechanical and elongation and compression set properties, are characterized by a fine surface appearance.

In all cases the crosslinking agent or agents are preferably present in the elastomer at a level of 1 to 10 parts on a mass basis per 100 parts on a mass basis of the mixture of elastomer with polymerization using a metallocene catalyst/grafted polyolefin/EPM or EPDM, whereas the crosslinking promoter or promoters are preferably present at a level of 0.5 to 12 parts on a mass basis per 100 parts on a mass basis of the mixture of elastomer with polymerization using a metallocene catalyst/grafted polyolefin/EPM or EPDM.

When the vulcanization system is a sulphur-based system, the sulphur-donor accelerator or accelerators are, for their part, preferably present in the elastomer at a level of 1 to 7 parts on a mass basis per 100 parts on a mass basis of the mixture of elastomer with polymerization using a metallocene catalyst/grafted polyolefin/EPM or EPDM.

In accordance with the invention the crosslinking of the elastomer may be carried out by means of two crosslinking systems. To give an example, it is possible to employ jointly a sulphur-based crosslinking system and a crosslinking system based on organic peroxides, or a crosslinking system based on a phenolic resin and a crosslinking system based on organic peroxides.

The elastomer in accordance with the invention is, furthermore, called "with thermoplastic conversion" because its conversion using the techniques and the equipment employed when processing thermoplastics: thermoforming, injection moulding, extrusion, forming, etc, has been found to be extremely easy.

While exhibiting mechanical properties in terms of hardness, of tensile strength and of elongation at break which are equivalent to those of the thermoplastic elastomers of the prior art which were mentioned earlier, the crosslinked elastomers with thermoplastic conversion in accordance with the invention have better compression and elongation set properties than the latter. This advantage is observed not only in the short term, but also in the long term, where the elastomers in accordance with the invention exhibit a lesser tendency to creep.

Another subject-matter of the present invention is a process for the manufacture of a crosslinked elastomer with thermoplastic conversion, as defined above, characterized in that it includes the mixing of an elastomer with polymerization using a metallocene catalyst and of a grafted polyolefin in the presence, optionally, of an ethylene/propylene (EPM) polymer or of an ethylene/propylene/diene (EPDM) polymer of a polyacrylic elastomer, of a plasticizer, of fillers and/or of adjuvants, and the crosslinking of this mixture with a suitably chosen crosslinking system at an appropriate temperature.

According to a preferred embodiment of the process in accordance with the invention, the temperature at which the crosslinking is performed is between 150 and 200° C.

According to a particularly preferred embodiment of the process in accordance with the invention, the latter includes:

a) mixing of the elastomer with polymerization using a metallocene catalyst, of the grafted polyolefin and of the crosslinking system in the presence, optionally, of EPM or of EPDM, of the polyacrylic elastomer, of the plasticizer, of the fillers and/or of the adjuvants;

b) heating this mixture to a temperature of between 150 and 200° C., and c) maintaining it at this temperature for a period of between 1 and 15 minutes, so as to obtain an optimum crosslinking of the elastomer.

This process may be carried out in an internal mixer or, alternatively, in a twin-screw or Bus-type extruder. Depending on the case, the resulting mass is calendered or extruded and then cooled and subjected to granulation. The granulates thus obtained are ready for being converted—by heating these granulates to a temperature higher than the melting temperature of the grafted polyolefin—into sheets, plates, sections, tubes or other desired products.

Another subject-matter of the present invention is the use of a crosslinked elastomer with thermoplastic conversion as defined above, for the manufacture of insulating and/or leakproofing gaskets and packings, as employed for thermal or sound insulation and/or leakproofing against water and moisture, especially in the building industry and by the automobile industry (for example door trims).

Another subject-matter of the present invention is the use of such an elastomer in the manufacture of conduits, of tubes, of pipes, of tubing, of couplings or the like for the transfer of fluids. Examples which may be cited are the conduits, pipes and other components provided for conveying fluids which are employed by the automobile industry in braking, cooling, power steering or air conditioning circuits.

The present invention will be understood better with the aid of the additional description which follows and which refers to examples of embodiment of the crosslinked elastomer with thermoplastic conversion in accordance with the invention.

It is obvious, however, that these examples are given solely by way of illustrations of the subject-matter of the invention, and do not constitute limitation thereof in any way.

EXAMPLE 1

Three crosslinked elastomers with thermoplastic conversion in accordance with the invention—elastomers 1, 2 and 3 hereinafter—are prepared by mixing in an internal mixer and with appropriate shearing:

Elastomer 1

60 parts on a mass basis of polyoctene as marketed by Du Pont Dow under the trade name Engage 8180, 15 parts on a mass basis of propylene/maleic anhydride polymer containing 0.6 mass % of maleic anhydride as marketed by Exxon under the trade name PO 1015, 25 parts on a mass basis of ethylene/propylene/ ethylidenenorbornene terpolymer (not oil-extended) as marketed by Exxon under the trade name Vistalon 8600, 10 parts on a mass basis of paraffinic plasticizer as marketed by Total under the trade name Plaxene 25110, 5 parts on a mass basis of dicumyl peroxide as marketed by Hercules under the trade name Dicup C, and 1 part on a mass basis of N,N'-m-phenylenedimaleimide as marketed by Du Pont de Nemours under the trade name HVA 2;

Elastomer 2

80 parts on a mass basis of polyoctene Engage 8180, 20 parts on a mass basis of propylene/maleic anhydride polymer PO 1015, 10 parts on a mass basis of paraffinic plasticizer Plaxene 25110, 4 parts on a mass basis of dicumyl peroxide Dicup C, and 1 part on a mass basis of N,N'-m-phenylenedimaleimide HVA2;

Elastomer 3

85 parts on a mass basis of polyoctene Engage 8180, 15 parts on a mass basis of propylene/maleic anhydride polymer PO 1015, 70 parts on a mass basis of paraffinic plasticizer Plaxene 25110, 110 parts on a mass basis of carbon blacks as marketed by Cabot under the trade name Spheron 6000, 5 parts on a mass basis of dicumyl peroxide Dicup C, and 1.5 parts on a mass basis of N,N'-m-phenylenedimaleimide HVA 2.

While continuing the shearing, the internal temperature of the mixers is raised to a value of 170° C. and, when this temperature is reached, the mixtures are kept at it for approximately 5 minutes. The masses thus obtained are cooled on leaving the mixers and are subjected to granulation.

The following are determined:

Shore A hardness according to the method described in NF standard T 46-052, tensile strength (T/S) and elongation at break (E/B) according to the method described in ISO standard 37, of each of the elastomers 1, 2 and 3 thus prepared, as well as:

the residual compression set (RCS) of the elastomers 2 and 3 at the end of a 25% compression applied for 22 hours at 100° C., according to the method described in ISO standard 815, and the residual elongation set (RES) of the elastomers 1 and 2 at the end of a 20% elongation applied for 70 hours, this being at 70° C. in the case of elastomer 1, at 100° C. in the case of the elasto-mers 1 and 2 and at 125° C. in the case of elastomer 2, according to the method described in ISO standard 2285.

The results are expressed in Table 1 below together with the values of Shore A hardness, of tensile strength (T/S), of elongation at break (E/B), of residual compression set (RCS) after a 25% compression applied for 22 hours at 100° C. and of residual elongation set (RES) after 20% elongations applied for 70 hours at 100° C. and at 125° C. for a reference polyolefinic thermoplastic elastomer, namely Santoprene 111-73 from AES, as measured in the same conditions.

TABLE 1

| Elastomers | 1 | 2 | 3 | Santoprene 111-73 |
|---|---|---|---|---|
| Shore A hardness | 66 | 76 | 77 | 78 |
| T/S (MPa) | 5.5 | 6.7 | 6.1 | 8.1 |
| E/B (%) | 190 | 440 | 250 | 375 |
| RCS 22 h at 100° C. (%) |  | 37 | 34 | 40 to 46 |
| RES 70 h at 70° C. (%) | 32 |  |  |  |
| RES 70 h at 100° C. (%) | 44 | 44 |  | 53 |
| RES 70 h at 125° C. (%) |  | 31 |  | 64 |

Table 1 shows that the crosslinked elastomers in accordance with the invention exhibit not only a hardness, a tensile strength and an elongation at break which are suitable, but also residual compression and elongation set percentages which are extremely satisfactory and are so equally well in the case of a stress applied at 70° C., 100° C. and at 125° C.

EXAMPLE 2

Two elastomers in accordance with the invention—called elastomer 4 and elastomer 5 hereinafter—are prepared by mixing in an internal mixer and with appropriate shearing:

Elastomer 4
  80 parts on a mass basis of polyoctene Engage 8180,
  20 parts on a mass basis of propylene/maleic anhydride polymer PO 1015,
  70 parts on a mass basis of paraffinic plasticizer Plaxene 25110,
  40 parts on a mass basis of silica as marketed by Rhône Poulenc under the trade name Ultrasil VN3,
  3 parts on a mass basis of dicumyl peroxide Dicup C, and
  1 part on a mass basis of N,N'-m-phenylenedimaleimide HVA 2;

Elastomer 5
  80 parts on a mass basis of polyoctene Engage 8180,
  18 parts on a mass basis of propylene/maleic anhydride polymer PO 1015,
  70 parts on a mass basis of paraffinic plasticizer Plaxene 25110,
  100 parts on a mass basis of carbon blacks Spheron 6000,
  3.5 parts on a mass basis of styrene/acrylonitrile/acrylate terpolymer as marketed by Goodyear under the trade name Sunigum,
  3.8 parts on a mass basis of 1,3-bis(t-butylisopropyl) benzene peroxide as marketed by Atochem under the trade name Peroxymond F 40,
  2.5 parts on a mass basis of 1,1-bis(t-butyl)-3,3,5-trimethylcyclohexane peroxide as marketed by Atochem under the trade name Trigonox 2940,
  5 parts on a mass basis of active zinc oxide,
  0.5 part on a mass basis of stearic acid,
  1.5 parts of N,N'-m-phenylenedimaleimide HVA 2, and
  0.33 part of a coupling agent as marketed by Sumitomo under the trade name Sumifine 1162.

As in Example 1, the temperature of the mixers is raised to a value of 170° C. while continuing the shearing and then the mixtures are kept at this temperature for approximately 5 minutes. The masses thus obtained are cooled and then subjected to granulation.

Shore A hardness, tensile strength (T/S), elongation at break (E/B) and residual compression set (RCS) after a 25% compression applied for 22 hours at 100° C., of each of the elastomers 4 and 5, and the residual elongation set (RES) of elastomer 5 after a 20% elongation applied for 70 hours at 100° C. are determined according to the methods described in the standards shown in Example 1.

The values thus obtained are expressed in Table 2 below. They are compared with those obtained for two control elastomers—elastomers T4 and T5 hereinafter—exhibiting the same qualitative and quantitative composition respectively as elastomers 4 and 5 and prepared in the same operating conditions as the latter, but with the exception that these elastomers T4 and T5 contain an ungrafted polypropylene such as that marketed by Shell under the name PP Copolymère, instead of the polypropylene grafted with maleic anhydride employed in the preparation of elastomers 4 and 5.

TABLE 2

| Elastomers | 4 | T4 | 5 | T5 |
|---|---|---|---|---|
| Shore A hardness | 68 | 60 | 71 | 71 |
| T/S (MPa) | 2.7 | 2.7 | 5.1 | 4.8 |
| E/B (%) | 170 | 420 | 190 | 170 |
| RCS 22 h at 100° C. (%) | 62 | 84 | 45 | 60 |
| RES 70 h at 100° C. (%) |  |  | 36 | 40 |

Comparison of the percentages of RCS shows that elastomers 4 and 5 exhibit a residual compression set which is markedly lower than that of elastomers T4 and T5 used as controls respectively. In addition, it is found that elastomer 5 exhibits a residual elongation set which is lower than that of elastomer T5. These results thus demonstrate the advantage of employing, in accordance with the invention, a grafted polyolefin such as a polypropylene grafted with maleic anhydride.

EXAMPLE 3

Two elastomers in accordance with the invention—elastomers 6 and 7 hereinafter—are prepared by mixing in two internal mixers and with appropriate shearing:

50 parts on a mass basis of polyoctene Engage 8180,
  41 parts on a mass basis of ethylene/propylene/ethylidenenorbornene terpolymer (extended with 15% of oil) as marketed by Exxon under the trade name Vistalon 8800,
  80 parts on a mass basis of paraffinic plasticizer Plaxene 25110,
  60 parts on a mass basis of carbon blacks as marketed by Cabot under the trade name FEF N550,
  4 parts on a mass basis of 1,3-bis(t-butylisopropyl) benzene peroxide Peroxymond F 40,
  3 parts on a mass basis of 1,1-bis(t-butyl)-3,3,5-trimethylcyclohexane peroxide Trigonox 2940,
  5 parts on a mass basis of active zinc oxide,
  1 part on a mass basis of stearic acid,
  3 parts on a mass basis of ethylene glycol dimethacrylate as marketed by Cray Valley under the trade name Sartomer SR 206,
  1 part on a mass basis of an external lubricant such as Dynamar PPA 790 marketed by 3M, with in the case of elastomer 6: 17 parts on a mass basis of propylene/maleic anhydride polymer PO 1015 containing 0.6 mass % of maleic anhydride, and in the case of elastomer 7: 17 parts on a mass basis of propylene/maleic anhydride polymer containing 1.2 mass % of maleic anhydride as available from Exxon.

As in the preceding examples, the internal temperature of the mixers is raised to a value of 170° C. while continuing the shearing and then the mixture is kept at this temperature for approximately 5 minutes. The masses thus obtained are cooled on leaving the mixers and subjected to granulation.

The residual compression set (RCS) of each of these elastomers 6 and 7 is determined at the end of a 25% compression applied for 22 hours at 100° C. (ISO standard 815). In these conditions elastomer 6 exhibits an RCS of 38% whereas elastomer 7 exhibits an RCS which is only 30%.

This example shows the advantage of employing a propylene/maleic anhydride polymer with a high content of maleic anhydride when it is desired to obtain an elastomer in accordance with the invention exhibiting a particularly low residual compression set.

EXAMPLE 4

Two elastomers in accordance with the invention—elastomers 8 and 9 hereinafter—are prepared in conditions which are identical with those described in Examples 1 to 3 and which include respectively:

Elastomer 8

35 parts on a mass basis of polyoctene as marketed by Du Pont Dow under the trade name Engage 8190, 15 parts on a mass basis of propylene/maleic anhydride polymer PO 1015, 50 parts on a mass basis of ethylene/propylene/ethylidenenorbornene terpolymer Vistalon 8800, 70 parts on a mass basis of paraffinic plasticizer Plaxene 25110, 100 parts on a mass basis of carbon blacks Spheron 6000, 8.25 parts on a mass basis of reactive alkylated bromomethylphenol-formaldehyde resin as marketed by Schenectady under the trade name Resin SP 1055, 5 parts on a mass basis of chlorosulphonated polyethylene as marketed by Du Pont de Nemours under the trade name Hypalon 4085, 3 parts on a mass basis of active zinc oxide, Elastomer 9

33 parts on a mass basis of polyoctene Engage 8180, 17 parts on a mass basis of propylene/maleic anhydride polymer containing 1.2 mass % of maleic anhydride, 57.5 parts on a mass basis of ethylene/propylene/ethylidenenorbornene terpolymer Vistalon 8800, 80 parts on a mass basis of paraffinic plasticizer Plaxene 25110, 55 parts on a mass basis of carbon blacks FEF N550, 10 parts on a mass basis of ethylene/acrylate/acrylic acid terpolymer as marketed by Exxon under the trade name ATX 325, 5 parts on a mass basis of active zinc oxide, 1 part on a mass basis of stearic acid, 1.25 parts on a mass basis of zinc dibutyldithiocarbamate (MLPC company), 0.5 part on a mass basis of tetramethylthiuram disulphide (MLPC company), 1.75 parts on a mass basis of 4,4'-dithiodimorpholine (MLPC company), 0.75 part on a mass basis of dipentamethylenethiuram tetrasulphide (MLPC company).

Table 3 below shows the values of Shore A hardness, of tensile strength (T/S), of elongation at break (E/B), of residual compression set (RCS) at the end of a 25% compression applied for 22 hours at 100° C. and of residual elongation set (RES) after a 20% elongation applied for 70 hours at 100° C., as obtained for each of the elastomers 8 and 9 according to the methods described in the standards shown in Example 1.

TABLE 3

| Elastomers | 8 | 9 |
| --- | --- | --- |
| Shore A hardness | 65 | 61 |
| T/S (MPa) | 4.8 | 4.3 |
| E/B (%) | 250 | 250 |
| RCS 22 h at 100° C. (%) | 35 | 33 |
| RES 70 h at 100° C. (%) | 44 | 46 |

These values show that crosslinking with a phenolic resin and crosslinking with a sulphur-based system make it possible to obtain elastomers in accordance with the invention which exhibit equivalent mechanical properties and set properties.

As follows from the above, the invention is not limited in any way to those of its embodiments and methods of processing which have just been described more explicitly; on the contrary, it embraces all the alternative forms which can come to the mind of a specialist in the subject, without departing from the framework or the scope of the present invention.

I claim:

1. A crosslinking elastomer with thermoplastic conversion, comprising:

a) at least one polyoctene, and b) a grafted polyolefin chosen from the group consisting of polyethylenes, polypropylenes, and ethylene/propylene polymers grafted with acrylic acid, maleic anhydride or glycidyl methacrylate.

2. The elastomer according to claim 1, wherein said grafted polyolefin is a propylene/maleic anhydride polymer.

3. The elastomer according to claim 2, wherein said propylene/maleic anhydride polymer has a maleic anhydride content higher than or equal to 1 mass % of the total mass of said propylene/maleic anhydride polymer.

4. The elastomer according to claim 1, which further comprises an ethylene/propylene (EPM) polymer or an ethylene/propylene/diene (EPDM) polymer.

5. The elastomer according to claim 1, which comprises, in parts on a mass basis:

a) 20 to 100 parts of polyoctene, b) 5 to 50 parts of grafted polyolefin, and c) 0 to 75 parts of EPM or EPDM.

6. The elastomer according to claim 1, which comprises, in parts on a mass basis:

a) 30 to 85 parts of polyoctene, b) 10 to 30 parts of propylene/maleic anhydride polymer, and c) 10 to 50 parts of EPDM.

7. The elastomer according to claim 1, which further comprises a polyacrylic elastomer and/or plasticizers and/or light fillers, and/or carbon black, and/or adjuvants.

8. The elastomer according to claim 1, which further comprises, before crossinglinking, at least one crosslinking system which includes one or more crosslinking agents and one or more crosslinking promoters.

9. The elastomer according to claim 8, wherein said crosslinking system includes, as crosslinking agents(s), one or more organic peroxides from the group consisting of dicumyl peroxyde, 1,3-bix(t-butyl-osopropyl)benzene peroxide, 2,5-dimethyl-2,5-bis-t-butyl-hexane and 1,1-bis(t-butyl)-3,3,5-trimethylcyclohexane and, as crosslinking promoter(s), one or more compounds from the group consisting of zinc oxide, stearic acid, N,N-m-phenylenedimaleimide, triallyl or trisisolalyl cyanurates, methacrylates, dimethacrylates and diacrylates.

10. The elastomer according to claim 8, wherein said crosslinking system is sulphur-based and, besides zinc oxide and/or stearic acid as crosslinking promoter(s), includes one or more sulphur-donor activators and, optionally, an antireversion agent.

11. The elastomer according to claim 8, wherein said crosslinking system includes, as crosslinking agent, a phenolic resin from the group consisting of reactive alkylated methylphenol-formaldehyde and bromomethylphenol-formaldehyde resins, and, further crosslinking promoter, a chlorine-containing polymer optionally used in combination with zinc oxide and/or stearic acid.

12. The mass elastomer according to claim 8, wherein said crosslinking agent or agents are present at a level of 1 to 10 parts on a mass basis per 100 parts on a mass basis of the mixture of polyoctene/grafted polyolefin/EPM or EPDM.

13. The elastomer according to claims 8, wherein said crosslinking promoter or promoters are present at a level of 0.5 to 12 parts on a mass basis per 100 parts on a mass basis of the mixture of polyoctene/grafted polyolefin/EPM or EPDM.

14. A process for the manufacture of a crosslinking elastomer with thermoplastic conversion according to claim 1, comprising:

a) mixing a polyoctene and a grafted polyolefin from the group consisting of polethylenes, polypropylenes, and ethylene/propylene polymers grafted with acrylic acid, maleic anhydride or glycidyl methacrylate, in the presence, optionally, of an ethylene/propylene (EPM) polymer or of an ethylene/propylene/diene (EPDM) polymer, of a polyacrylic elastomer, of a plasticizer, of fillers and/or adjuvants, and b) crosslinking the mixture resulting from step a) with a suitably chosen crosslinking system at a temperature between 150 and 200° C.

15. The process according to claim 14, which comprises:

a) mixing said polyoctene, said grafted polyolefin and said crosslinking system, in the presence, optionally, of EPM or of EPDM, of said polyacrylic clastomer, of said plasticizer, of said fillers and/or of said adjuvants, and b) heating the mixture resulting from step a) to a temperature between 150- and 200° C., and c) maintaining said mixture at said temperature for a period of time between 1 and 15 minutes.

* * * * *

UNITED STATES PATENT AND TRADEMARK OFFICE
CERTIFICATE OF CORRECTION

PATENT NO. : 6,028,142
DATED : February 22, 2000
INVENTOR(S) : Garois It is certified that error appears in the above-identified patent and that said Letters Patent is hereby corrected as shown below:

Title page, item [54], line 1 and column 1, line 1:
In the title, "CROSS-LINKED" should read --CROSSLINKED--.

Title page, [56] References Cited, U.S. PATENT DOCUMENTS, line 4, "6/1995" should read --1/1997--; line 5, "1/1996" should read --9/1998--; line 6, "6/1996" should read --2/1999--.

Title page, [57] Abstract, line 3, after "the" insert --crosslinked--.

Column 11, line 5, after "peroxides" insert --selected--; line 9, after "compounds" insert --selected--; line 20, after "resin" insert --selected--; line 22, "further" should read --as--; line 25, cancel "mass".

Column 12, line 7, after "polyolefin" insert --selected--; line 16, "chosen" should read --selected--.

Signed and Sealed this

Third Day of April, 2001

*Attest:*

NICHOLAS P. GODICI

*Attesting Officer*     *Acting Director of the United States Patent and Trademark Office*